US010276210B2

(12) United States Patent
Cole et al.

(10) Patent No.: US 10,276,210 B2
(45) Date of Patent: Apr. 30, 2019

(54) VIDEO ENHANCEMENT

(71) Applicant: International Business Machines Corporation, Armonk, NY (US)

(72) Inventors: Anthony L. Cole, Hampshire (GB); Thomas J. Davison, Southampton (GB); Daniel Del Piccolo, Portsmouth (GB); Daniel Lane, Hampshire (GB); James S. Luke, Isle of Wight (GB); Martine M. Pulvenis, Hampshire (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 247 days.

(21) Appl. No.: 14/944,501

(22) Filed: Nov. 18, 2015

(65) Prior Publication Data
US 2017/0140792 A1 May 18, 2017

(51) Int. Cl.
*G11B 27/036* (2006.01)
*G06T 7/70* (2017.01)
*G06T 7/13* (2017.01)

(52) U.S. Cl.
CPC .............. *G11B 27/036* (2013.01); *G06T 7/13* (2017.01); *G06T 7/70* (2017.01)

(58) Field of Classification Search
CPC ...... G11B 27/032; G06K 9/00711; G06T 7/00
See application file for complete search history.

(56) References Cited

U.S. PATENT DOCUMENTS

| 5,566,251 | A | * | 10/1996 | Hanna | ..................... | H04N 5/272 |
| | | | | | | 348/588 |
| 6,005,967 | A | * | 12/1999 | Nakagawa | .............. | G06T 15/40 |
| | | | | | | 345/422 |
| 6,052,648 | A | * | 4/2000 | Burfeind | ................ | H04N 5/222 |
| | | | | | | 348/586 |
| 6,307,526 | B1 | * | 10/2001 | Mann | .................... | G02B 27/017 |
| | | | | | | 345/7 |
| 6,597,406 | B2 | | 7/2003 | Gloudemans et al. | | |
| 6,731,825 | B1 | * | 5/2004 | Acampora | ........... | H04N 5/2224 |
| | | | | | | 345/630 |

(Continued)

OTHER PUBLICATIONS

Devleopment of Head-Mounted Projection Displays for Distributed, Collaborative, Augmented Reality Applications, Jannic P. Rolland et al, Presence, vol. 14, No. 5, Oct. 2005, 528-549 (Massuchuesetts Institute of Technology).*

(Continued)

*Primary Examiner* — Brian P Yenke
(74) *Attorney, Agent, or Firm* — Daniel Simek; George S. Blasiak; Heslin Rothenberg Farley & Mesiti P.C.

(57) ABSTRACT

Methods, systems, and computer program products for generating revised videos. The method includes, for example, receiving, by one or more processor, first video data of an environment having at least one projection on a screen from a first point of view, and generating, by the one or more processor, revised video data of the environment having the at least one projection on the screen from the first point of view based on the first video data, the revised video data comprising a plurality of frames with the at least one projection on the screen disposed in the first area relative to the environment in a plurality of frames being revised based on data for projecting the at least one projection on the screen in the first video data.

4 Claims, 13 Drawing Sheets

(56) References Cited

U.S. PATENT DOCUMENTS

| | | | | |
|---|---|---|---|---|
| 7,024,039 B2* | 4/2006 | Simard | H04N 19/60 | 348/586 |
| 7,095,450 B1* | 8/2006 | Holmes | A63F 13/12 | 345/629 |
| 7,116,342 B2* | 10/2006 | Dengler | G06T 15/20 | 345/619 |
| 7,139,767 B1* | 11/2006 | Taylor | G06F 17/30244 | |
| 7,206,029 B2* | 4/2007 | Cohen-Solal | H04N 5/45 | 345/629 |
| 7,330,875 B1 | 2/2008 | Parasnis et al. | | |
| 7,769,342 B2* | 8/2010 | Tabe | H04M 1/6083 | 455/3.06 |
| 7,827,488 B2* | 11/2010 | Sitrick | G09G 5/377 | 715/716 |
| 8,098,330 B2* | 1/2012 | Ferri | H04N 9/75 | 348/564 |
| 8,384,790 B2 | 2/2013 | Knapp | | |
| 8,408,710 B2 | 4/2013 | Jang et al. | | |
| 8,515,258 B2 | 8/2013 | Chaudhuri et al. | | |
| 8,732,273 B2* | 5/2014 | Tsao | G06F 3/04815 | 348/159 |
| 8,824,861 B2* | 9/2014 | Gentile | G06T 5/50 | 386/278 |
| 8,972,499 B2 | 3/2015 | Arnett et al. | | |
| 8,988,436 B2* | 3/2015 | Becker | G06T 13/80 | 345/419 |
| 9,282,287 B1* | 3/2016 | Marsh | H04N 7/152 | |
| 9,286,508 B2* | 3/2016 | Martin | G06K 9/00234 | |
| 9,536,339 B1* | 1/2017 | Worley | G06T 15/00 | |
| 9,626,766 B2* | 4/2017 | Criminisi | G06T 7/50 | |
| 9,626,798 B2* | 4/2017 | Zavesky | G06T 19/006 | |
| 9,640,219 B1* | 5/2017 | Patierno | G11B 27/032 | |
| 9,712,741 B2* | 7/2017 | Kothari | B60R 11/0235 | |
| 9,817,332 B2* | 11/2017 | Igarashi | G03G 15/043 | |
| 2002/0018070 A1* | 2/2002 | Lanier | G06F 3/14 | 345/629 |
| 2005/0024388 A1* | 2/2005 | Takemoto | G06T 19/006 | 345/633 |
| 2007/0285419 A1* | 12/2007 | Givon | G06K 9/3216 | 345/420 |
| 2009/0168027 A1* | 7/2009 | Dunn | G03B 21/26 | 353/28 |
| 2010/0318916 A1* | 12/2010 | Wilkins | G06F 3/14 | 715/730 |
| 2012/0056971 A1* | 3/2012 | Kumar | H04M 3/567 | 348/14.02 |
| 2012/0167146 A1* | 6/2012 | Incorvia | H04N 21/234318 | 725/60 |
| 2012/0249554 A1* | 10/2012 | Chen | G06K 9/00979 | 345/428 |
| 2012/0327127 A1* | 12/2012 | Fukuda | H04N 1/3875 | 345/668 |
| 2013/0141530 A1* | 6/2013 | Zavesky | H04N 21/234318 | 348/43 |
| 2013/0194259 A1* | 8/2013 | Bennett | G06T 19/006 | 345/420 |
| 2013/0207896 A1* | 8/2013 | Robinson | G06F 3/04815 | 345/158 |
| 2014/0105573 A1* | 4/2014 | Hanckmann | G06K 9/00718 | 386/241 |
| 2014/0161314 A1* | 6/2014 | Ostrovsky-Berman | G06F 17/30864 | 382/103 |
| 2014/0254939 A1* | 9/2014 | Kimura | H04N 5/23219 | 382/201 |
| 2014/0368669 A1* | 12/2014 | Talvala | H04N 5/272 | 348/207.1 |
| 2015/0023602 A1* | 1/2015 | Wnuk | G06F 17/30247 | 382/190 |
| 2015/0070587 A1* | 3/2015 | Emeott | H04N 21/4316 | 348/589 |
| 2015/0102998 A1* | 4/2015 | Oami | H04N 5/74 | 345/156 |
| 2015/0106755 A1* | 4/2015 | Moore | G06F 3/0484 | 715/765 |
| 2015/0260474 A1* | 9/2015 | Rublowsky | F41A 33/00 | 434/16 |
| 2015/0279010 A1* | 10/2015 | Cianfrone | G09G 5/003 | 345/592 |
| 2015/0363996 A1* | 12/2015 | Keilwert | G07F 17/3211 | 463/31 |
| 2016/0035075 A1* | 2/2016 | Yamamoto | G06K 9/4661 | 382/274 |
| 2016/0073040 A1* | 3/2016 | Jen | G06T 7/10 | 348/239 |
| 2016/0073055 A1* | 3/2016 | Marsh | H04N 7/152 | 348/14.08 |
| 2016/0082888 A1* | 3/2016 | Kothari | B60R 1/00 | 348/148 |
| 2016/0119692 A1* | 4/2016 | Chatter | H04N 21/84 | 725/109 |
| 2016/0134797 A1* | 5/2016 | Perez-Feliciano | H04N 5/2258 | 348/262 |
| 2016/0142672 A1* | 5/2016 | Bostick | H04N 7/152 | 348/14.07 |
| 2016/0189334 A1* | 6/2016 | Mason | G06T 19/006 | 345/419 |
| 2016/0224122 A1* | 8/2016 | Dietz | G06F 9/451 | |
| 2016/0240004 A1* | 8/2016 | Ur | G06T 19/006 | |
| 2016/0335773 A1* | 11/2016 | Romano | G06T 7/521 | |
| 2016/0350609 A1* | 12/2016 | Mason | G06K 9/00892 | |
| 2016/0360970 A1* | 12/2016 | Tzvieli | A61B 5/015 | |
| 2016/0366396 A1* | 12/2016 | Kim | G06T 7/70 | |
| 2017/0001112 A1* | 1/2017 | Gilmore | A63F 13/30 | |
| 2017/0004644 A1* | 1/2017 | Bostick | G06T 11/60 | |
| 2017/0061704 A1* | 3/2017 | Gewicke | G06T 19/006 | |
| 2017/0083086 A1* | 3/2017 | Mazur | G06F 3/012 | |
| 2017/0091535 A1* | 3/2017 | Yu | G06K 9/00248 | |
| 2017/0127023 A1* | 5/2017 | High | H04N 13/344 | |
| 2017/0192232 A1* | 7/2017 | Katz | G02B 27/017 | |
| 2017/0256040 A1* | 9/2017 | Grauer | H04N 1/00196 | |
| 2017/0313248 A1* | 11/2017 | Kothari | B60K 35/00 | |
| 2017/0326462 A1* | 11/2017 | Lyons | A63F 13/90 | |
| 2018/0032139 A1* | 2/2018 | Whiteford | G11B 27/00 | |
| 2018/0040190 A1* | 2/2018 | Keilwert | G07F 17/3211 | |
| 2018/0157321 A1* | 6/2018 | Liu | G06F 3/013 | |

OTHER PUBLICATIONS

FaceVR: Real-Time Gaze-Aware Facial Reenactment in Virtual Reality, pp. 1-16, Mar. 21, 2018, Jutus Thies et al . . . .*

* cited by examiner

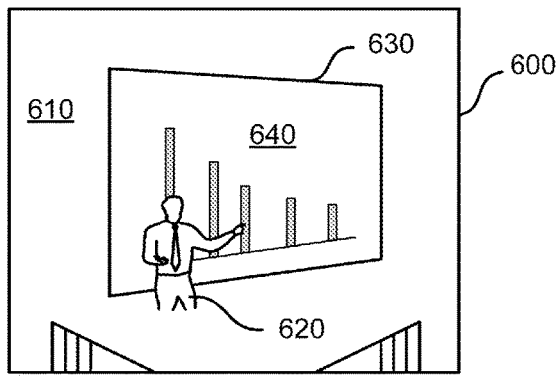
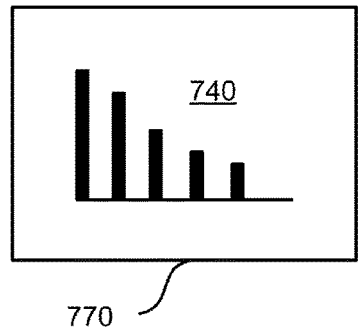
FIG. 9  FIG. 10
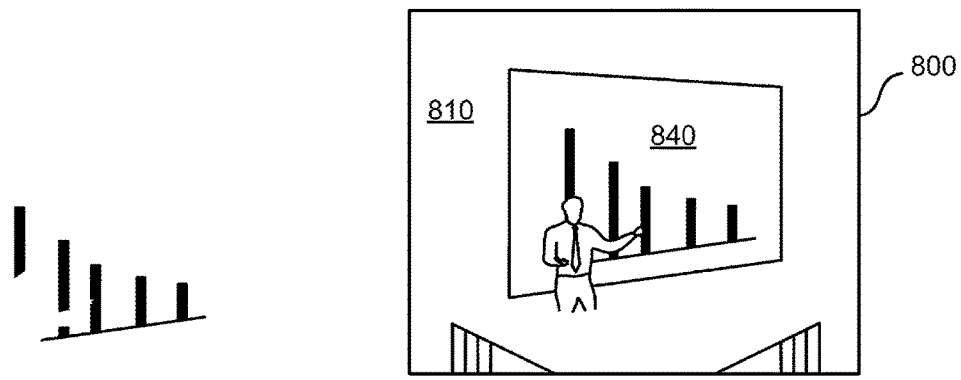
FIG. 11  FIG. 12

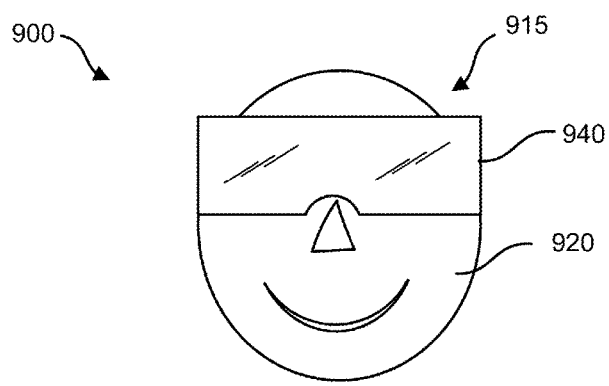
FIG. 13
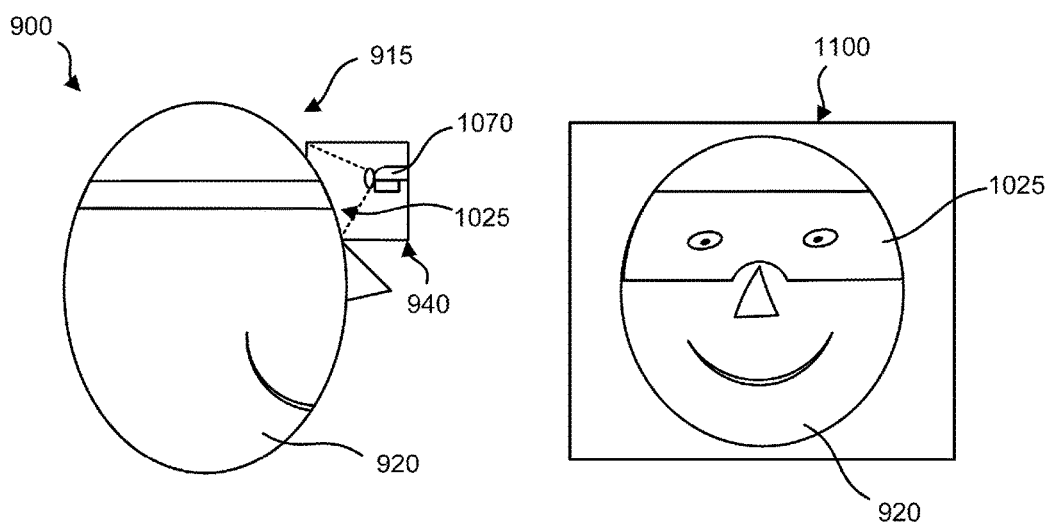
FIG. 14  FIG. 15

VIDEO ENHANCEMENT

TECHNICAL FIELD

The present disclosure relates generally to videos, and more particularly, to enhancement of videos.

BACKGROUND

When filming a presentation in which a projection such as a presentation slide or an image is projected on a screen, a recorded video of the presentation often includes the projected slide or image being washed out and/or obscured by glare which makes the projected image in the recorded video of the presentation generally of poor quality and/or unreadable when viewing the recorded video.

SUMMARY

Shortcomings of the prior art are overcome and additional advantages are provided through the provision, in one aspect, of a computer-implemented method. The computer-implemented method includes, for example, receiving, by one or more processor, first video data of an environment having an object observed from a first point of view, the first video data comprising a plurality of frames having the object disposed in an area of the plurality of frames, and generating, by the one or more processor, revised video data of the environment having the object from the first point of view based on the first video data, the revised video data comprising a plurality of frames with the object disposed in the area of the plurality of frames being revised based on data corresponding to the object separate from the first video data.

In aspect, a computer program product is provided. The computer program product includes: a computer readable storage medium readable by one or more processing unit and storing instructions for execution by one or more processor for performing a method for controlling display of an image on a display screen. The method includes, for example, receiving first video data of an environment having an object observed from a first point of view, the first video data comprising a plurality of frames having the object disposed in an area of the plurality of frames, and generating revised video data of the environment having the object from the first point of view based on the first video data, the revised video data comprising a plurality of frames with the object disposed in the area of the plurality of frames being revised based on data corresponding to the object separate from the first video data.

In a further aspect, a system is provided. The system includes: a memory; and one or more processor in communication with the memory, and program instructions executable by the one or more processor via the memory to perform a method for controlling display of an image on a display screen. The method includes, for example, receiving first video data of an environment having an object observed from a first point of view, the first video data comprising a plurality of frames having the object disposed in an area of the plurality of frames, and generating revised video data of the environment having the object from the first point of view based on the first video data, the revised video data comprising a plurality of frames with the object disposed in the area of the plurality of frames being revised based on data corresponding to the object separate from the first video data.

Additional features and advantages are realized through the techniques set forth herein. Other embodiments and aspects are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 9 illustrates a frame of the video including the display screen with the projection on the screen of FIG. 8;

FIG. 10 is a display screen of a slide or an image for projecting the projection in the presentation of FIG. 8;

FIG. 11 is a display screen of slide or image for projecting the projection in the presentation of FIG. 10 with at least one portion removed;

FIG. 12 is a display screen of a frame of a revised video of the presentation including the projection based on the slide or image of FIG. 11 for projecting the projection in the presentation;

FIG. 13 is a diagrammatic illustration of a setup for obtaining a video of a virtual reality conference;

FIG. 14 is a diagrammatic illustration of the setup, in part cross-section, of the setup of FIG. 13;

FIG. 15 is a display screen of a frame of a revised video corresponding to the setup of FIGS. 13 and 14;

DETAILED DESCRIPTION

Figure 1:
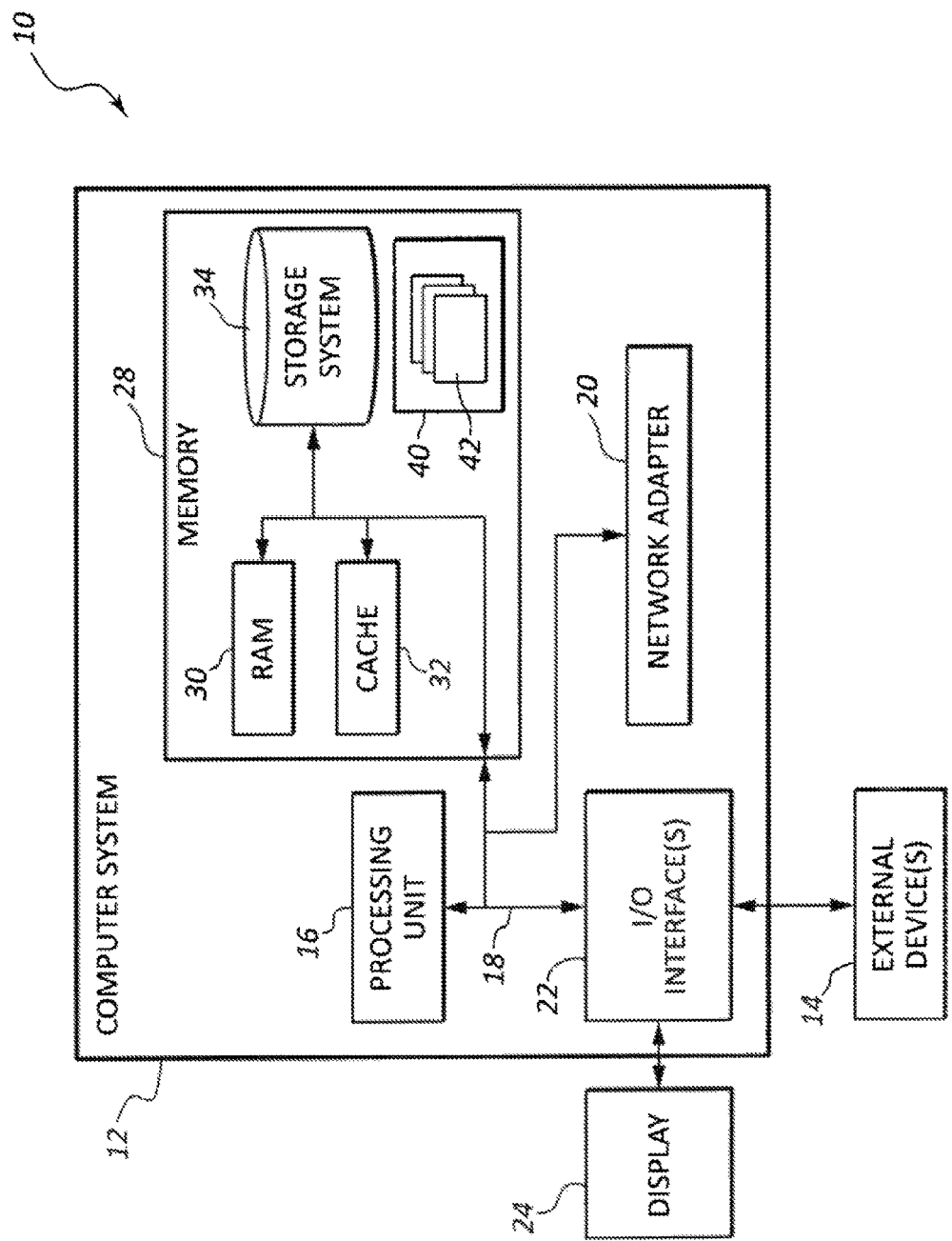
FIG. 1 depicts a cloud computing node according to an embodiment of the present invention.

Aspects of the present disclosure and certain features, advantages, and details thereof, are explained more fully below with reference to the non-limiting examples illustrated in the accompanying drawings. Descriptions of well-known materials, fabrication tools, processing techniques, etc., are omitted so as not to unnecessarily obscure the disclosure in detail. It should be understood, however, that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure.

The present disclosure provides, in part, methods, systems, and computer program products, network devices, and virtual machine management software for generating revised videos of an environment having an object. Such a revised video may result in a more realistic video of the environment with the object such that the revised video may provide a better quality video to an observer viewing the video on a display screen such as an LCD display compared to the observer viewing the original video of the environment and the object. For example, the revised video may include a revised or enhanced object on a screen when an observer views the revised video on a display screen. In addition, the enhanced object in the environments in the revised video may remain and appear at the same location and orientation, and from the same point of view, as in the original video of the environment with the object. Such a technique of the present disclosure may provide an enhanced and more realistic video of a presentation, for example, with both a presenter and projections on a screen shown in the video, compared to a conventional attempt at recorded videos of a presentation by replacing a portion of the recorded video of the presenter with a full screen image of a projected slide or image. Such a technique of the present disclosure may provide an enhanced and more realistic video of a presentation, for example, with both a presenter and projections on a screen shown in the video, compared to another conventional attempt at a recorded video of a presentation using a split screen approach with the presenter shown on one side of the video and an image of the projected slide or image shown on an opposite side of the video.

FIGS. 1-4 depict various aspects of computing, including cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in cloud computing node 10 is shown in the form of a general-purpose computing device. The components of computer system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
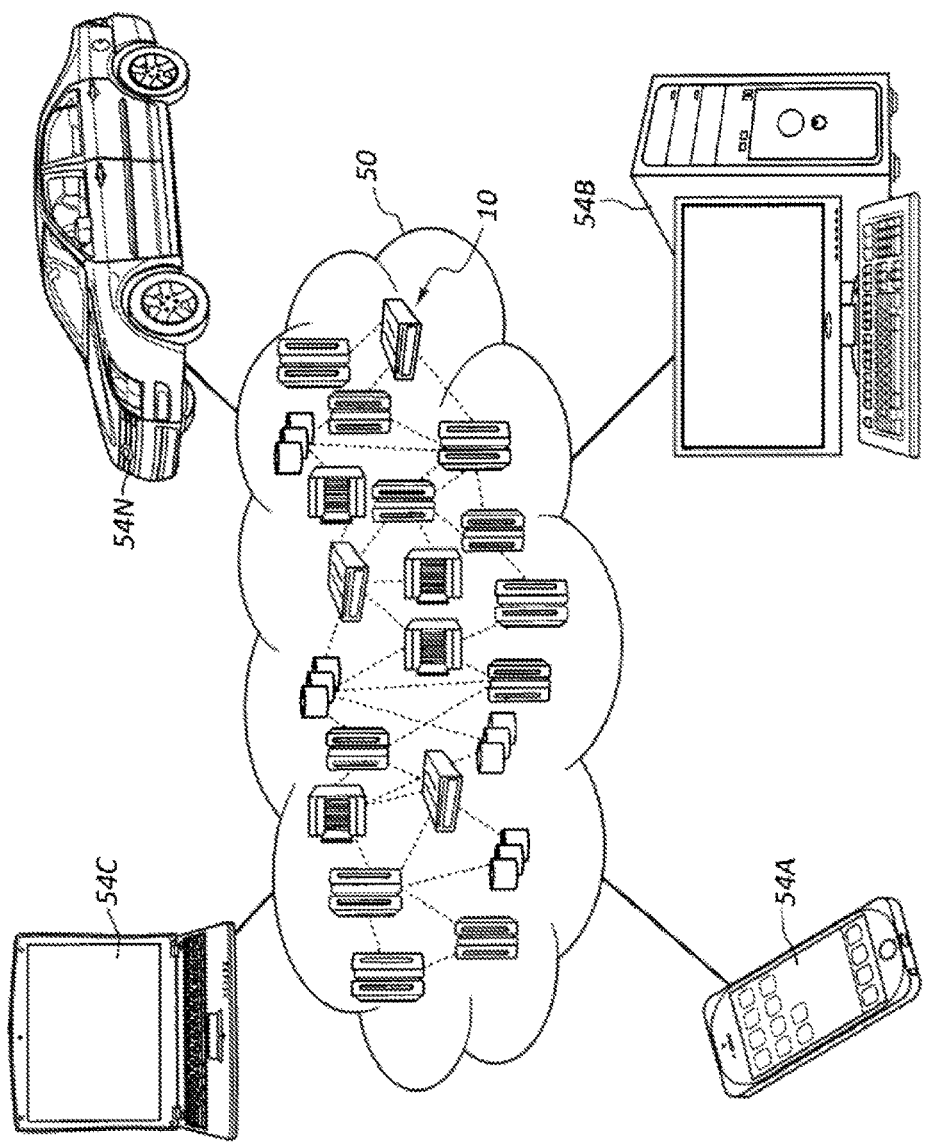
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
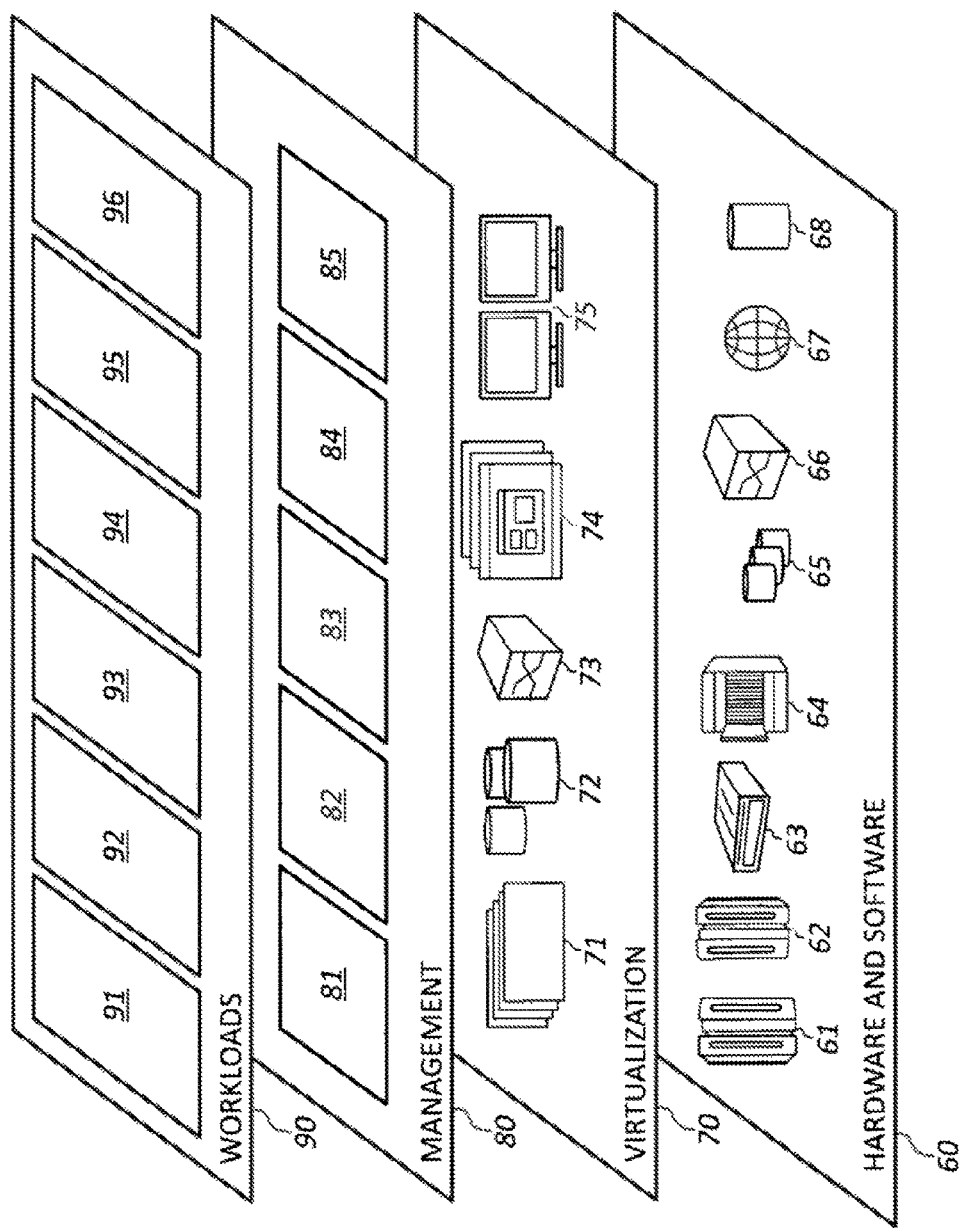
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and video revising resources 96 as described herein.

Figure 4:
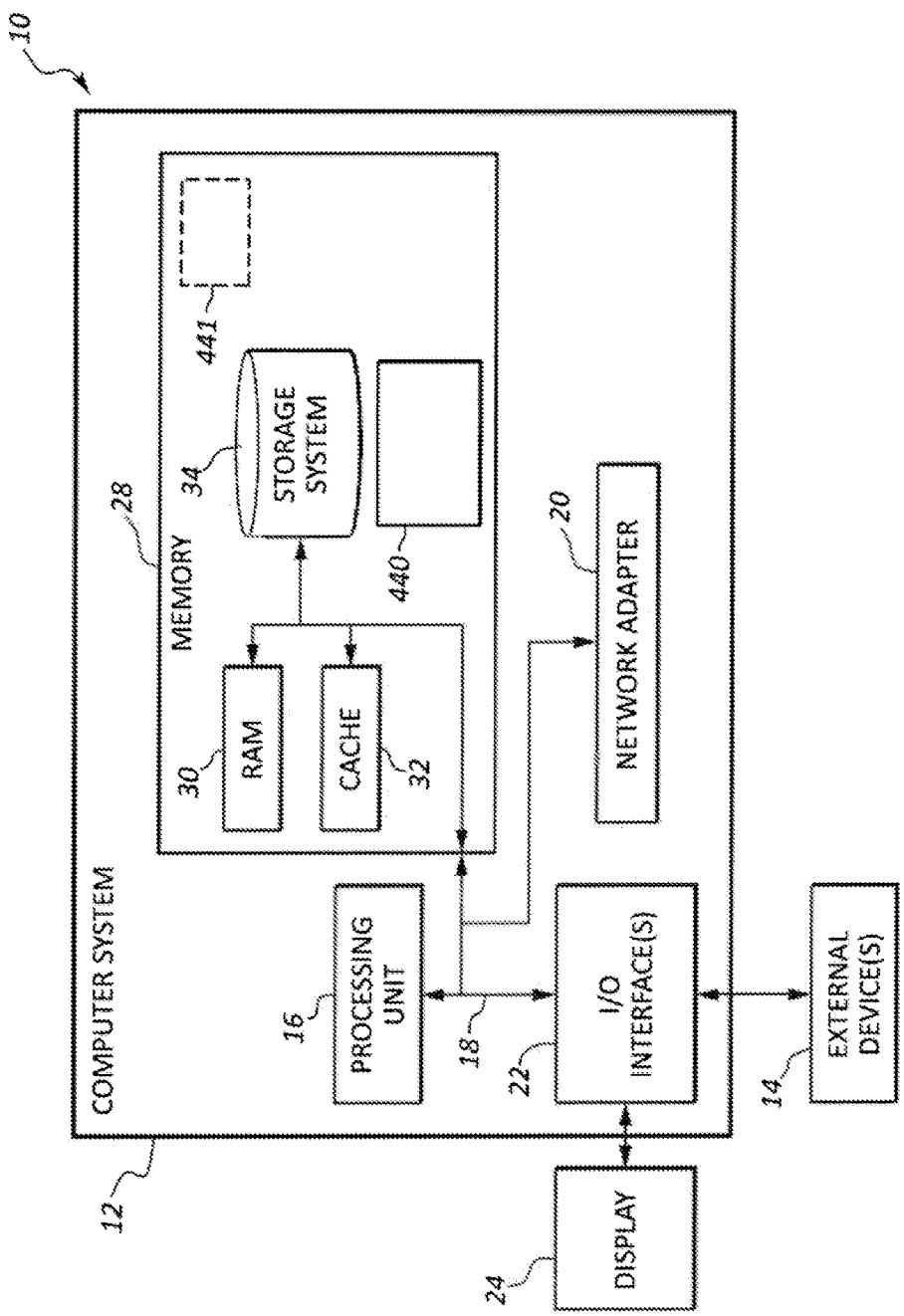
FIG. 4 depicts a hardware overview of a computing node, in accordance with one or more aspects set forth herein.

FIG. 4 depicts a hardware overview of a computing node 10, which may be a cloud computing node, in accordance with one or more aspects set forth herein. The computing node as set forth in FIG. 4 can include the hardware components as set forth in reference to computing node 10 as set forth in reference to FIG. 1. By way of example, computing node 10 may generally be any of the computing devices described herein, such as network devices, client computers, server computers, etc.

Program/utility 40 as set forth in FIG. 1 can provide the functionality of video revising resources 96 as set forth in FIG. 3. Program/utility 40 as set forth in FIG. 1 can include one or more program 440 as set forth in FIG. 4, and program/utility 40 as set forth in FIG. 1 can optionally include some or all of one or more program 441.

One or more program 440 can have a set (at least one) of program modules, and may be stored in memory 28 by way of example, and not limitation, as well as an operating system, one or more application programs, other program modules, and program data. Each of the operating system, one or more application programs, other program modules, program data, and one or more program, or some combination thereof, may include an implementation of a networking environment. One or more program 440 (and optionally at least one of one or more program 441) generally carry out the functions and/or methodologies of embodiments of the invention as described herein, such as video revising resources 96 (FIG. 3).

Referring again to FIG. 4:

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media, (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 5:
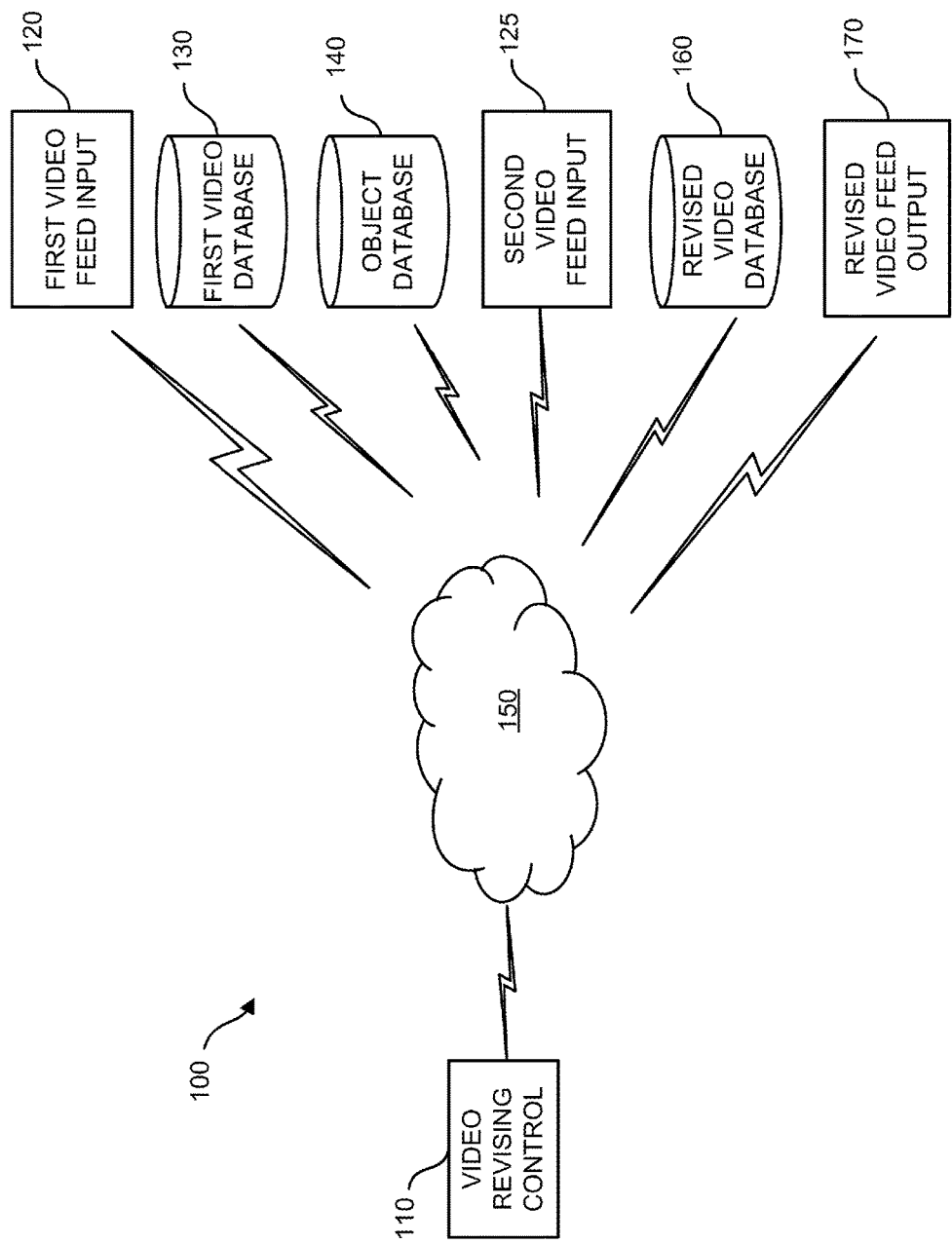
FIG. 5 is an exemplary block diagram of a system, in accordance with one or more aspects set forth herein.

FIG. 5 is an exemplary block diagram of a system 100, in accordance with one or more aspects set forth herein. For example, network 150 may be a physical network or a virtual network. A physical network can be, for example, a physical telecommunications network connecting numerous computer nodes or systems, such as computer servers and computer clients. By contrast a virtual network can, for example, combine numerous physical networks or parts thereof into a logical virtual network. In another example, numerous virtual networks can be defined over a single physical network.

By way of explanation, FIG. 5 depicts exemplary system 100 in which one or more video revising control 110 may be operable for generating revised videos of an environment having an object. In one example, video revising control 110 can be in communication with one or more first video feed input 120, one or more first video database 130, one or more object database 140, one or more second video feed input 125, one or more revised video database 160, and/or one or more revised video feed output 170. As will be appreciated from the description below, system 100 may include less than the component illustrated in FIG. 5. For example, in one embodiment, a system may include video revising control 110, one or more first video database 130, one or more object database 140, and one or more revised video database 160. In another embodiment, a system may include video revising control 110, one or more first video feed input 120, one or more second video feed input 125, and one or more revised video feed output 170. In another embodiment, a system may include video revising control 110, one or more first video feed input 120, one or more object database 140, and one or more revised video feed output 170.

One or more first video feed input 120, one or more first video database 130, one or more object database 140, one or more second video feed input 125, one or more revised video database 160, and/or one or more revised video feed output 170 shown as being in communication via a network 150 with video revising control 110 may alternatively be co-located at video revising control 110.

Figure 6:
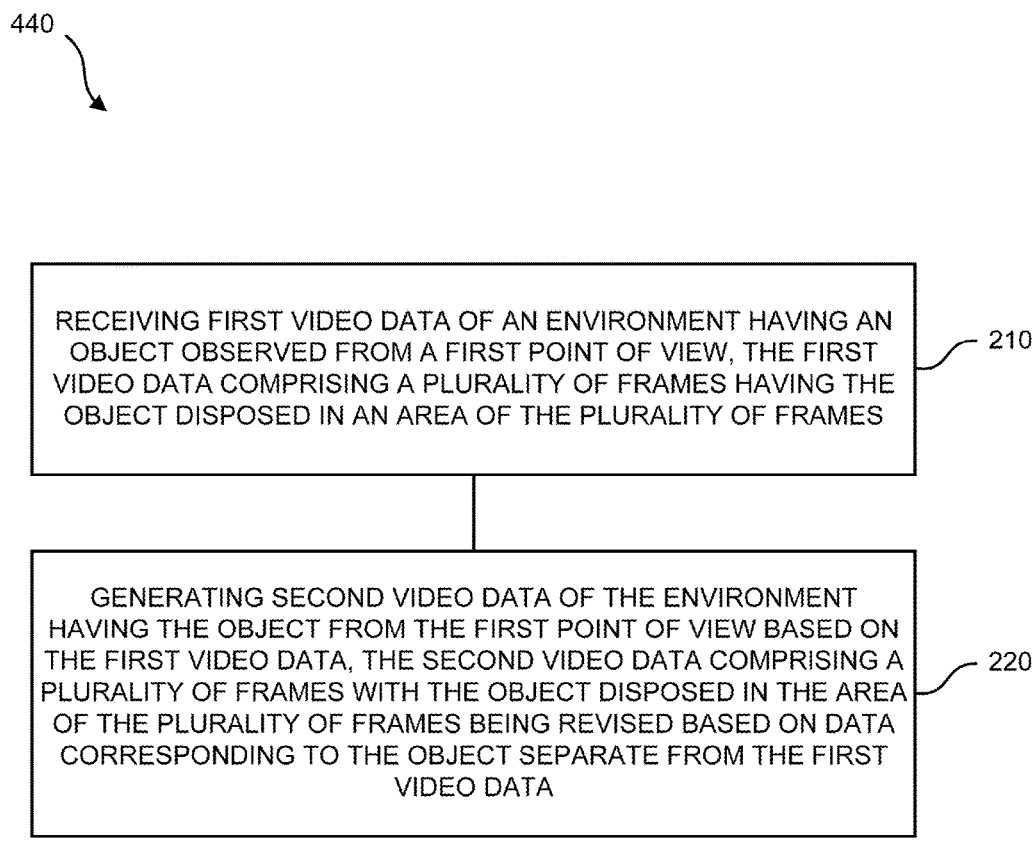
FIG. 6 is a flowchart of a method according to an embodiment of the present invention.

FIG. 6 illustrates a process for generating revised videos in accordance with aspects of the present disclosure. By way of example, the processes described with respect to FIG. 6 can be performed using one or more program 440 (FIG. 4) on one or more video revising control 110 (FIG. 5), as detailed with respect to FIG. 4.

For example, one or more program 440 may include at 210, receiving first video data of an environment having an object observed from a first point of view, the first video data comprising a plurality of frames having the object disposed in an area of the plurality of frames (e.g., receiving video data from first video input 120 or from first video database 130 of FIG. 5 in video revising control 110 of FIG. 5), and generating revised video data of the environment having the object from the first point of view based on the first video data, the revised video data comprising a plurality of frames with the object disposed in the area of the plurality of frames being revised based on data corresponding to the object separate from the first video data (e.g., generating revised video data in video revising control 110 of FIG. 5 from first video input 120 or from first video database 130 of FIG. 5 and data corresponding to the object from object database 140 of FIG. 5).

Figure 7:
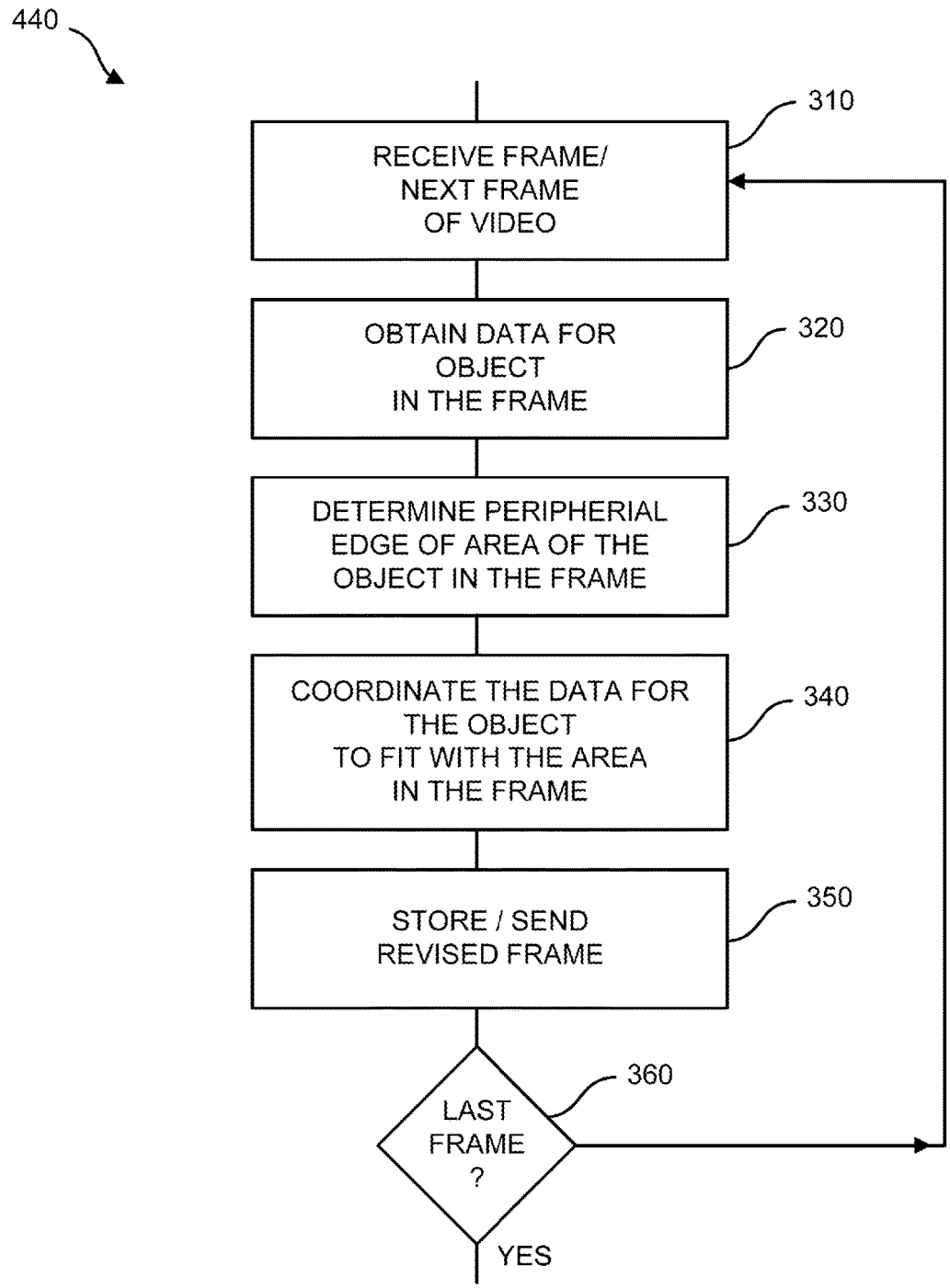
FIG. 7 is a flowchart of a method according to an embodiment of the present invention.

FIG. 7 illustrates a process for generating revised videos in accordance with aspects of the present disclosure. By way of example, the processes described with respect to FIG. 7 can be performed using one or more program 440 (FIG. 4) on one or more video revising control 110 (FIG. 5), as detailed with respect to FIG. 4.

Referring to the flow diagram of FIG. 7, for example, one or more program 440 may include at 310 receiving a frame or next frame of a video (e.g., in video revising control 110 of FIG. 5), at 320 obtaining data for the object in the frame (e.g., receiving object data from object database 140 of FIG. 5), at 330 determining the peripheral edge of the area of the object in the frame (e.g., in video revising control 110 of FIG. 5), at 340 coordinating the data for the object to fit within the area of the object in the frame (e.g., in video revising control 110 of FIG. 5), and at 350 storing or sending the revised frame (e.g., from video revising control 110 of FIG. 5 to revised video database 160 or revised video feed output 170 of FIG. 5). At 360, if the frame is the last frame of the video, the process ends, and if not, the process includes obtaining the next frame at 310, and repeating the process until the last frame of the video.

FIGS. 8-12 diagrammatically illustrate a process for revising a video of an environment having an object such as a video presentation having a projection on a screen in accordance with aspects of the present disclosure. For example, a revised video may remove the glare or enhance a poorly lit or washed out projection on the screen in the original video when the revised video is viewed on for example an LCD display compared to an observer viewing the original video of the presentation having a projection on a screen on the LCD display. The projection on the screen may be based on slides such as Microsoft PowerPoint slides, images, photographs, charts, video clips, and any other projections operable to being projected on a screen. As described below, object database 140 (FIG. 5) may store data for the projections during the presentation.

Figure 8:
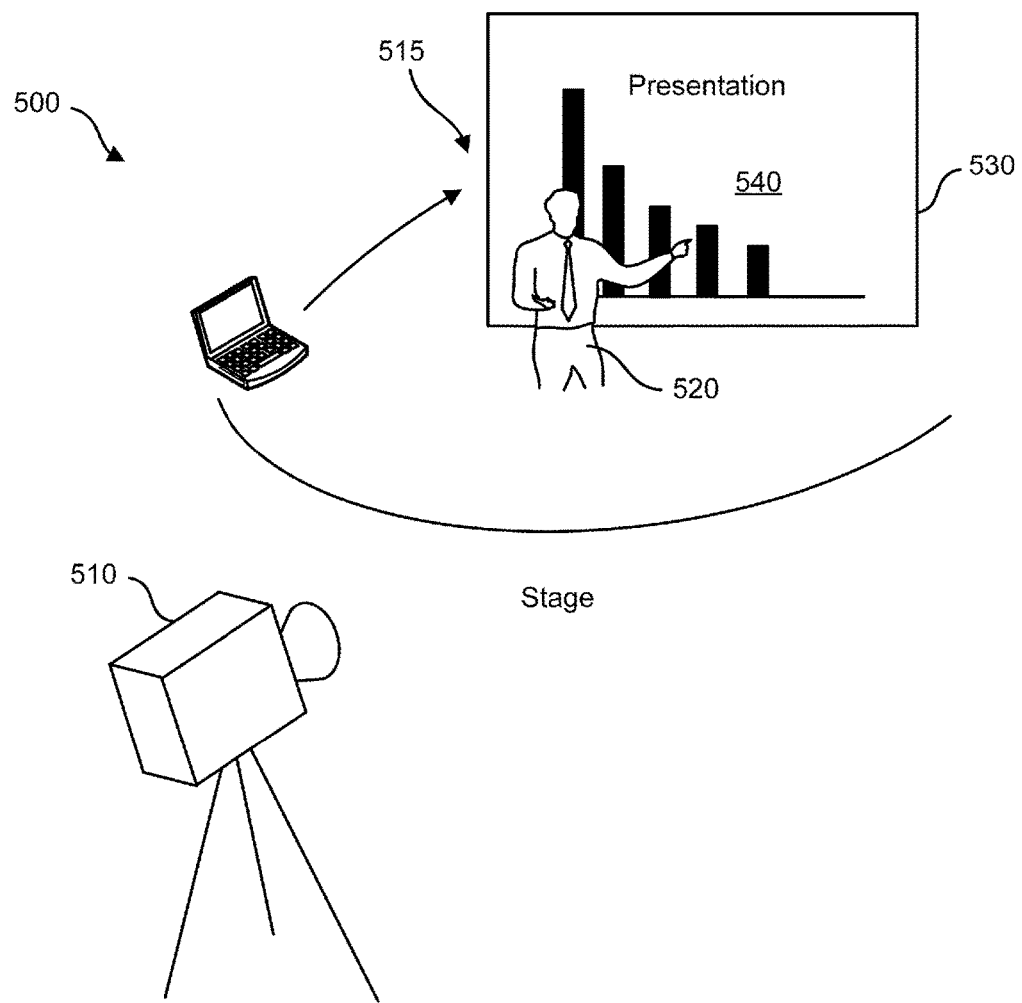
FIG. 8 is a diagrammatic illustration of a setup for obtaining a video of a presentation including a projection on a screen.

As shown in FIG. 8, a setup 500 of a video presentation may include a video camera 510 for recording an environment 515 of a presentation by a person or presenter 520 which includes a screen 530 having a projection 540 such as a graph disposed on the screen. The video camera may obtain video and audio of the presenter and the projection on a screen from a point of view. While the point of view may be generally fixed, it will be appreciated that the camera may move during the presentation such that the point of view may change during the recorded video of the presentation.

FIG. 9 illustrates a frame 600 of the video including a representation of an environment 610, a person 620, and a screen 630 with a projection 640 disposed thereon. As illustrated in FIG. 9, frame 600 may include projection 640 being washed out and/or obscured by glare which makes the projected image in the recorded video of the presentation generally of poor quality and/or unreadable when viewing the recorded video.

FIG. 10 illustrates a display screen 770 such as computer monitor of a slide or image 740 for projection on the screen during the video. FIG. 11 illustrates a revised slide or image by coordinating the slide or image of FIG. 10 to fit within the boundary area in the frame of FIG. 9 (e.g., performed by one or more program 440 (FIG. 4) on one or more video revising control 110 (FIG. 5)), which may be based on, for example, the peripheral edge of the area of the projection on the screen in the frame of FIG. 9 and identification of the area occupied by the presenter in the frame of FIG. 9. The data represented in FIG. 11 may enhance or replace the data in the original frame as shown in FIG. 12. For example, a frame 800 of a revised video may include a representation of an environment 810, a person 820, and a screen 830 with a projection 840 disposed thereon.

From the present disclosure and with reference to FIGS. 9-12, for example, video revising control 110 (FIG. 5) operating one or more program 440 (FIG. 6 or FIG. 7) may employ a suitable image recognition process or program operable to review each frame of the video such as FIG. 9 and look for objects such as a person, and a projection on a screen. Such identified projection on the screen may be used to retrieve the corresponding slide or image from object database 140 (FIG. 5). Alternately, data for projecting the projections on the screen in the presentation, for example in object database 140, may be employed or used for searching the frame to locate a corresponding projection on a screen in the frame of the video. The location of an area of a projection found in one frame may be used for anticipating the location and area for locating projections on the screen in subsequent frames.

The video revising control 110 (FIG. 5) operating one or more program 440 (FIG. 6 or FIG. 7) may be operable to determine the boundary or peripheral edge of the projection on the screen. For example, when the video is obtained from a side of a stage of the presentation such as from a point of view from the side, the projected image may have a non-square or non-rectangular configuration or otherwise having a perspective view when viewed in 2-dimensions in a frame of the video.

The size, shape, location, rotation, orientation, and/or outline, etc. of the projection on the screen in the frame of the original video may be operable for generating a corresponding size, shape, location, rotation, orientation, and/or outline, etc. of the presentation from the data for projecting the projection. For example, the corners of the projection on the screen in frames of the original video may be operable for calculating, determining, or otherwise generating a corresponding size, shape, location, rotation, and/or orientation, etc. of the presentation from the data for projecting the projection. It will be appreciated that other suitable processes for coordinating the observed projection on the screen with the data for projecting the projected image may be operably employed.

As a presenter may be observed in the original video, the presenter may block or obscure a portion of the projection on the screen in the frame of the original video. The size, shape, location, rotation, outline, and/or orientation, etc. of the area of the projection on the screen less the presenter in the frame of the original video may be operable for generating a corresponding size, shape, location, rotation, orientation, and/or outline, etc. of the presentation less the presenter from the data for projecting the projection.

The video revising control 110 (FIG. 5) operating one or more program 440 (FIG. 6 or FIG. 7) may either enhance the presentation parts of the original filmed video frame so that a revised video looks more like the presentation. The enhancements may be replacement of portions or parts of the frame with the raw footage image or data for projecting the presentation, or merging or revising of portions or parts of the frame with the raw input or data for projecting the projection. The color balance/hue/saturation/etc. may also be adjusted so that the image looks closer to the raw input as possible.

FIGS. 13-15 diagrammatically illustrate a process for revising a video of an environment having an object such a participant in a virtual reality conference wearing a virtual reality headset in accordance with embodiments of the present disclosure. For example, a virtual reality conference may allow the participants to see each other in virtual reality space. Generally, the cameras observing each participant records the participants so others can see them, however the participants are observed wearing their virtual reality headsets so no one can see what their facial expressions are. With one or more cameras provided on the inside of the virtual reality headsets, the image of the participant's face could be obtained during the live stream video of the person. Each participant in the teleconference may receive a revised video that removes the virtual reality headset of other participants in the video when the revised video is viewed on for example a virtual reality headset compared to the participant viewing the original video of the other participants on the virtual reality headset. The image of the participant's facial expression such as eyes may be over laid on the live stream video of the person so that the entire face can be seen by others in the virtual reality space.

For example, as shown in FIGS. 13 and 14, a setup 900 for one of the participants of a of a virtual reality conference may include a first video camera (not shown in FIGS. 13 and 14) which may be a front facing camera on an electronic device such as a computer monitor, smartphone, tablet, or other suitable device held or positioned in front of the participant for recording an environment 915 including a participant 920 and a virtual reality headset 940 worn by the participant. The first video camera may obtain video and audio of the participant and the virtual reality headset from a point of view (which may be a first video feed input such as first video feed input 120 as shown in FIG. 5). While the point of view may be generally fixed, it will be appreciated that the camera and/or the participant may move during the presentation such that the point of view may change during the recorded video of the presentation.

As shown in FIG. 14, a second camera 1070 may be operable for receiving a second video of the obscured portion 1025 of the face of participant 920 which is obscured by virtual reality headset 940. The second video camera may obtain video of the obscured portion of the participant (which may be a second video feed input such as second video feed input 125 as shown in FIG. 5).

FIG. 15 illustrates a display screen 1100 of a virtual reality headset of a second participant (not shown) for projecting the combined video feed of participant 920 and the second video feed of the obscured portion 1025 of the first participant. For example, the second video may fit within the boundary area of the virtual reality headset in the frames of the first video as shown in FIG. 15 (e.g., performed by one or more program 440 (FIG. 4) on one or more video revising control 110 (FIG. 5)). Frames of the second video may enhance or replace portions of the frames in the first video.

From the present disclosure and with reference to FIGS. 13-15, for example, video revising control 110 (FIG. 5) operating one or more program 440 (FIG. 6 or FIG. 7) may be operable to determine the boundary or peripheral edge of the virtual reality headset in the first video. For example, when the participant turns one's head during the virtual reality conference, the boundary of the observed virtual reality headset will change when viewed in 2-dimensions in a frame of the video.

The size, shape, location, rotation, orientation, and/or outline, etc. of the virtual reality headset in the frames of the first video may be operable for generating a corresponding size, shape, location, rotation, orientation, and/or outline, etc. of a corresponding portion based on the second video of the portion of the participant. It will be appreciated that other suitable processes for coordinating the second video with the first video may be operably employed.

Figure 16:
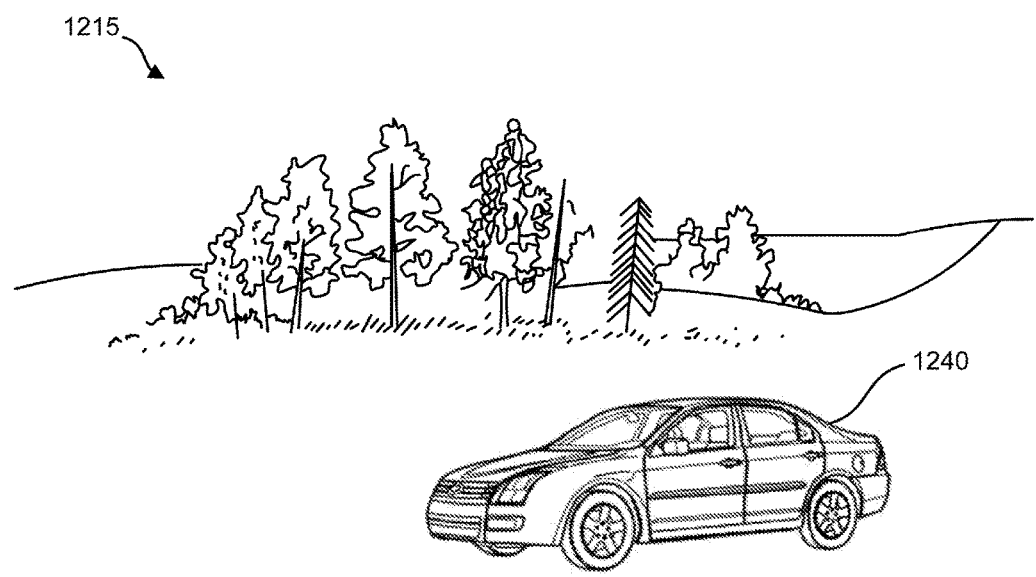
FIG. 16 is an illustration of an environment having an object for obtaining a video and generating a revised video.

FIG. 16 illustrates an environment 1215 having an object such as a vehicle 1240 disposed at a distance which may be obtained in a video. For example, the video may be obtained by a video camera (not shown) such as a video camera supported by, for example, another vehicle, or at another location such as adjacent to the ground or in the air may obtain video of the environment including the vehicle from a point of view. While the point of view may be generally fixed, it will be appreciated that the video camera may move such that the point of view may change during the recorded video of the environment. The technique of the present disclosure may be operable to revise a video of the environment having an object such as a vehicle. For example, a revised video may provide an enhanced view of the vehicle in the original video when the revised video is viewed on a display, for example, an LCD display, compared to an observer viewing the original video of the vehicle a screen on the LCD display.

From the present disclosure, for example, video revising control 110 (FIG. 5) operating one or more program 440 (FIG. 6 or FIG. 7) may employ a suitable image recognition process or program operable to review each frame of the video and look for objects such as a vehicle. Such identified vehicle may enable retrieving corresponding data from a database of a plurality of vehicles, e.g., object database 140 (FIG. 5). Alternately, data regarding the objects such as vehicles in object database 140 (FIG. 5) may enable searching the frames of the video to locate a corresponding vehicle or object in the frame of the video. The location of an area of an object in the frame may be used for anticipating the location of an area for locating objects in subsequent frames.

The video revising control 110 (FIG. 5) operating one or more program 440 (FIG. 6 or FIG. 7) may be operable to determine the boundary or peripheral edge of the vehicle in the frame. The size, shape, location, rotation, orientation, and/or outline, etc. of the vehicle in the environment in the frame of the original video may be operable for generating a corresponding size, shape, location, rotation, orientation, and/or outline, etc. of the vehicle from the data of a plurality of vehicles in the database. For example, the corners or hard edges of the vehicle in the frames of the original video may be operable for calculating, determining, or otherwise generating a corresponding size, shape, location, rotation, and/or orientation, etc. of a vehicle from data of a plurality of vehicles in the data base. It will be appreciated that other suitable processes for coordinating the observed object with data for the object separate from the first or original video may be operably employed. The data from the data base corresponding to the object may be used to enhance or replace the data in the original video.

Figure 17:
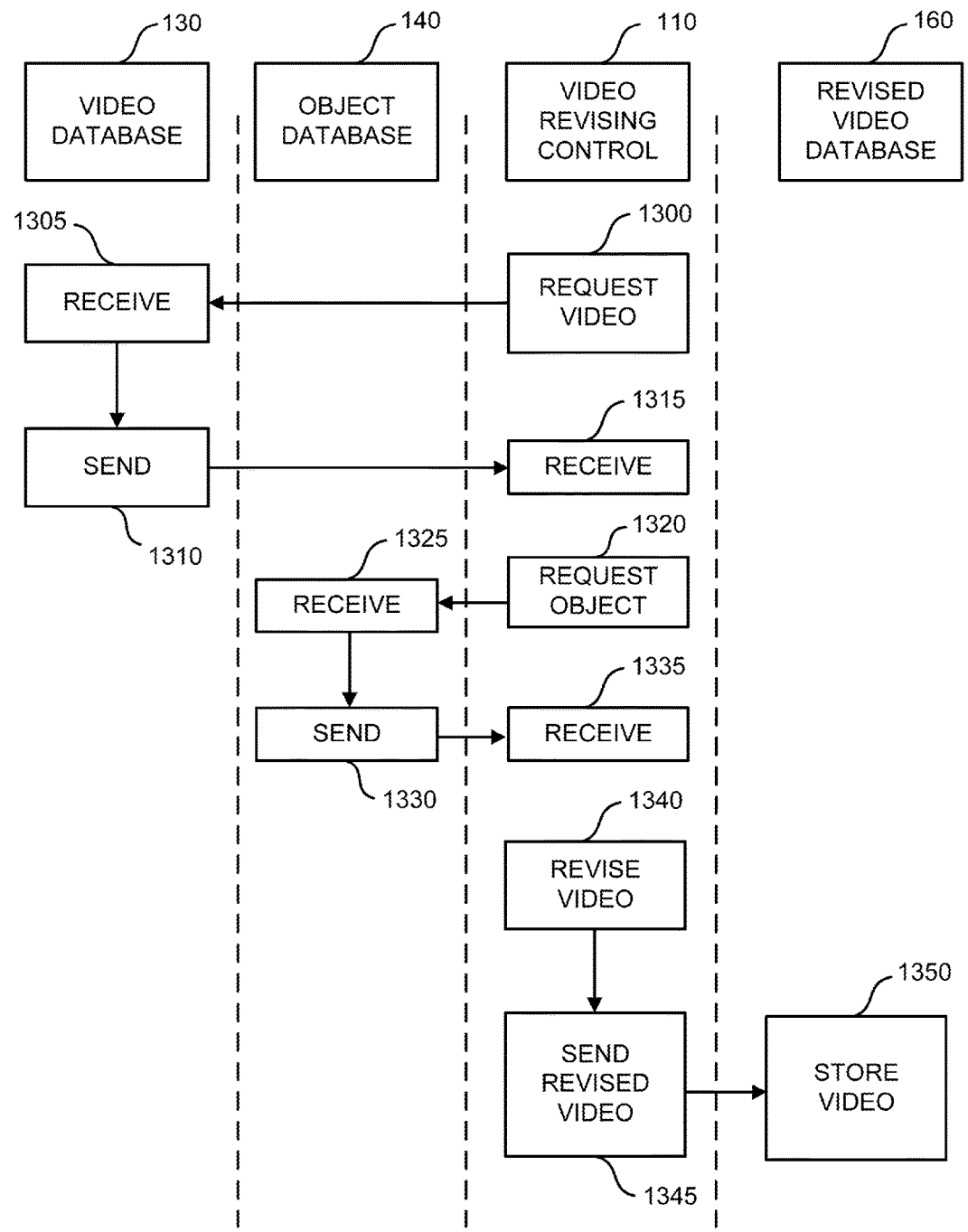
FIGS. 17 and 18 are diagrams illustrating further aspects of a process in accordance with one or more aspects set forth herein.

FIG. 17 is a diagram illustrating further aspects of a process for generating revised videos in accordance with one or more aspects set forth herein. By way of explanation, in FIG. 17, processes are illustrated from the point of view of a video revising control 110 (e.g., video revising one or more programs 440 or 441 of FIG. 5), first video database 130 (e.g., first video database 130 of FIG. 5), object database 140 (e.g., object database 140 of FIG. 5), and revised video database 160 (e.g., revised video database 160 of FIG. 5).

In one or more embodiments, one or more program 440 may run on a different collection of physical or virtual machines or processors, depending on the need for scalability of the system. In one specific example, one or more program 440 could run on a single multiprocessor server system. In another specific example, various portions of one or more program 440 may run on different processors running on different computing nodes.

By way of overview, FIG. 17 illustrates, at least in part, one or more embodiments for generating revised videos. It will be understood that based on a different set or order of inputs one or more program 440 can provide different functionality than the functionality described with reference to FIG. 17.

Initially, at block 1300 a request by video revising control 110 for a video may be sent to first video database 130, which request is received at block 1305. First video database 130 can send at block 1310 an original video which is received by video revising control 110 at block 1315.

In one embodiment, at block 1320 a request is made for data regarding one or more objects is made corresponding to one or more object in the video and forwarded for receipt to object database 140 at block 1325. At block 1330, data regarding the one or more object is sent to video revising control 110 and received at block 1335. The video is revised at block 1340, sent at block 1345 to revised video database 160 for storing at block 1350.

Figure 18:
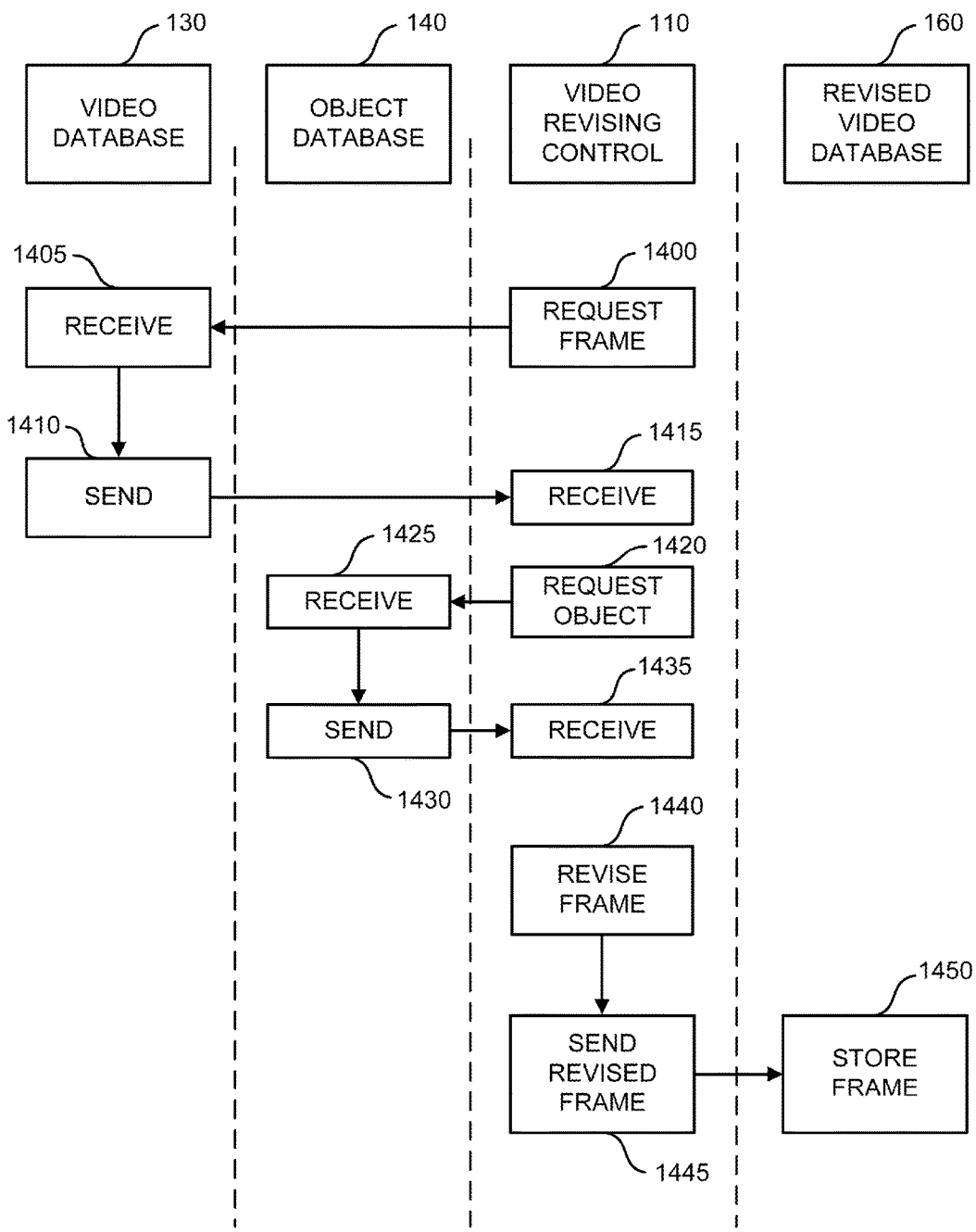

FIG. 18 is a diagram illustrating further aspects of a process for generating revised videos in accordance with one or more aspects set forth herein. By way of explanation, in FIG. 18, processes are illustrated from the point of view of video revising control 110 (e.g., video revising one or more programs 440 or 441 of FIG. 5), first video database 130 (e.g., first video database 130 of FIG. 5), object database 140 (e.g., object database 140 of FIG. 5), and revised video database 160 (e.g., revised video database 160 of FIG. 5).

In one or more embodiments, one or more program 440 may run on a different collection of physical or virtual machines or processors, depending on the need for scalability of the system. In one specific example, one or more program 440 could run on a single multiprocessor server system. In another specific example, various portions of one or more program 440 may run on different processors running on different computing nodes.

By way of overview, FIG. 18 illustrates, at least in part, one or more embodiments for generating revised videos. It will be understood that based on a different set or order of inputs one or more program 440 can provide different functionality than the functionality described with reference to FIG. 14.

Initially, at block 1400 a request by video revising control 110 for a frame of a video may be sent to first video database 130, which request is received at block 1405. First video database 130 can send at block 1410 a frame of an original video which is received by video revising control 110 at block 1415.

In one embodiment, at block 1420 a request is made for data regarding one or more objects corresponding to one or more objects in the frame and forwarded for receipt to object database 140 at block 1425. At block 1430, data regarding the one or more objects in the frame is sent to video revising control and received at block 1435. The frame is revised at block 1440, sent at block 1445 to revised video database 160 for storing at block 1450.

As described above, while an original video database is shown in FIGS. 17 and 18, it will be appreciated that instead of an original video database, a video revising control may be operable for receiving a live feed of a video or frames having an object (e.g., from first video feed input 120 in FIG. 5 and/or from second video feed input 125 in FIG. 5) directly or via a network. In addition, while a revised video database is shown in FIGS. 17 and 18, it will be appreciated that instead of a revised video database, a video revising control may be operable for transmitting a live feed of a revised video or frames having at least one object (e.g., via revised video feed output as shown in FIG. 5) directly or via a network.

There is set forth herein (A1) A computer-implemented method comprising: receiving, by one or more processor, first video data of an environment having an object observed from a first point of view, the first video data comprising a plurality of frames having the object disposed in an area of the plurality of frames; and generating, by the one or more processor, revised video data of the environment having the object from the first point of view based on the first video data, the revised video data comprising a plurality of frames with the object disposed in the area of the plurality of frames being revised based on data corresponding to the object separate from the first video data. There is set forth herein (A2) the computer-implemented method of (A1) wherein the generating comprises identifying the object in the frame and retrieving the data corresponding to the object from a database based on the identified object. There is set forth herein (A3) the computer-implemented method of (A1) wherein the data corresponding to the object separate from the first video data comprises video data obtained of the environment behind the object during the first video. There is set forth herein (A4) the computer-implemented method of (A1) wherein the receiving and the generating are performed in real-time. There is set forth herein (A5) the computer-implemented method of (A1) wherein the generating comprises determining a peripheral edge of the area of the object in the plurality of frames, and the revised video data comprises the revised object based on the determined peripheral edge. There is set forth herein (A6) the computer-implemented method of (A1) wherein the data corresponding to the object separate from the first video data comprises the object from a second point of view, and the generating comprises reorienting the object from the second point of view to correspond to the first point of view. There is set forth herein (A7) the computer-implemented method of (A1) wherein the generating comprises enhancing the object disposed in the first area in the plurality of frames of the revised video data with the data corresponding to the object separate from the first video data. There is set forth herein (A8) the computer-implemented method of (A1) wherein the generating comprises replacing the object disposed in the first area in the plurality of frames of the revised video data with the data corresponding to the object separate from the first video data. There is set forth herein (A9) the computer-implemented method of (A1) wherein the generating comprises retaining an obstruction in front of a portion of the object in the revised video data. There is set forth herein (A10) the computer-implemented method of (A8) wherein the generating comprises identifying the area of the object in one of the frames of the plurality of frames, and using the identified area in the one of the frames for identifying the area of the object in a subsequent frame. There is set forth herein (A11) the computer-implemented method of (A1) wherein the first video data comprises the object comprising at least one projection on the screen, and the revised video data comprises the plurality of frames with the at least one projection on the screen disposed in the area of the plurality of frames being revised based on the data for projecting the projection on the at least one projection on the screen in the first video. There is set forth herein (A12) the computer-implemented method of (A11) wherein the generating comprises identifying the at least one projection on the screen in the frame and retrieving the data for projecting the projection on the at least one projection on the screen in the first video based the identified object. There is set forth herein (A13) the computer-implemented method of (A1) wherein the first video data of the environment comprises the object comprising a virtual reality headset, and the revised video data comprises the plurality of frames with the virtual reality headset disposed in the area of the plurality of frames being revised based on second video data obtained of the environment behind the virtual reality headset during the first video. There is set forth herein (A14) the computer-implemented method of (A8) wherein the generating comprises synchronizing the second video data obtained of the environment behind the virtual reality headset during the first video with the first video data. There is set forth herein (A15) the computer-implemented method of (A1) wherein the first video data comprises the object comprising a vehicle, and the revised video data comprises the plurality of frames with the vehicle disposed in the area of the plurality of frames being revised based on the data corresponding to the vehicle separate from the first video data. There is set forth herein (B1) A computer program product comprising: a computer readable storage medium readable by one or more processing unit and storing instructions for execution by one or more processor for performing a method for controlling display of an image on a display screen, the method comprising: receiving, by one or more processor, first video data of an environment having an object observed from a first point of view, the first video data comprising a plurality of frames having the object disposed in an area of the plurality of frames; and generating, by the one or more processor, revised video data of the environment having the object from the first point of view based on the first video data, the revised video data comprising a plurality of frames with the object disposed in the area of the plurality of frames being revised based on data corresponding to the object separate from the first video data. There is set forth herein (B2) the computer program product of (B1) wherein the generating comprises identifying the object in the frame and retrieving the data corresponding to the object from a database based on the identified object. There is set forth herein (B3) The computer program product of claim (B1) wherein the data corresponding to the object separate from the first video data comprises video data obtained of the environment behind the object during the first video. There is set forth herein (C1) A system comprising: a memory; one or more processor in communication with the memory; and program instructions executable by the one or more processor via the memory to perform a method for controlling display of an image on a display screen, the method comprising: receiving, by one or more processor, first video data of an environment having an object observed from a first point of view, the first video data comprising a plurality of frames having the object disposed in an area of the plurality of frames; and generating, by the one or more processor, revised video data of the environment having the object from the first point of view based on the first video data, the revised video data comprising a plurality of frames with the object disposed in the area of the plurality of frames being revised based on data corresponding to the object separate from the first video data. There is set forth herein (C2) the system of claim (C1) wherein the generating comprises identifying the object in the frame and retrieving the data corresponding to the object from a database based on the identified object.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

The invention claimed is:

1. A system comprising:
  a memory;
  one or more processor in communication with the memory; and
  program instructions executable by the one or more processor via the memory to perform a method for controlling display of an image on a display screen, the method comprising:
    receiving, by one or more processor, first video data of an environment having an object observed from a first point of view, the first video data comprising a plurality of frames having the object disposed in an area of the plurality of frames; and
    generating, by the one or more processor, revised video data of the environment having the object from the first point of view based on the first video data, the revised video data comprising a plurality of frames with the object disposed in the area of the plurality of frames being revised based on data corresponding to the object separate from the first video data, wherein the receiving and generating are performed in real time, wherein the environment is a virtual reality conference, wherein a plurality of participants of the virtual reality conference are wearing virtual reality headsets, wherein the first video data represents a changing viewing point and is obtained using a front facing camera facing forward of a certain participant of the plurality of participants, wherein the system is configured to facilitate participants of the plurality of participants seeing each other in virtual reality space, wherein facial features of the plurality of the participants are hidden by the respective virtual reality headsets of the plurality of participants, wherein the first video data of the environment comprises the object comprising a virtual reality headset of each of the plurality of participants, and the revised video data comprises the plurality of frames with the virtual reality headset disposed in the area of the plurality of frames being revised based on second video data obtained of the environment behind the virtual reality headset of each of the plurality of participants during the first video, the second video being obtained using cameras located within the respective virtual reality headsets of the plurality of participants, wherein the generating comprises synchronizing the second video data obtained of the environment behind the respective virtual reality headsets of the plurality of participants during the first video with the first video data, the first video data being a live feed of video frames, and the method including transmitting a live feed of the revised video via a network, wherein the system is operative so that when the certain participant turns his or her head, a boundary of a particular virtual reality headset of the plurality of virtual reality headsets changes in the first video data, wherein the system is configured to use the second video data obtained using cameras located within the respective virtual reality headsets of the plurality of participants to overlay live facial expressions of the respective participants on virtual reality headset portions of the first video data.

2. The system of claim 1 wherein the generating comprises determining a peripheral edge of the area of the object in the plurality of frames, and the revised video data comprises a revised object based on the determined peripheral edge.

3. The system of claim 1 wherein the data corresponding to the object separate from the first video data comprises the object from a second point of view, and the generating comprises reorienting the object from the second point of view to correspond to the first point of view.

4. The system of claim 1 wherein the generating comprises identifying the area of the object in one of the frames of the plurality of frames, and using the identified area in the one of the frames for identifying the area of the object in a subsequent frame.

* * * * *